May 31, 1960 N. H. CHRISTOPHER 2,938,665

READING HEAD

Filed Oct. 8, 1954

NATHAN H. CHRISTOPHER,
INVENTOR,

BY [signature]

HIS ATTORNEY.

United States Patent Office 2,938,665
Patented May 31, 1960

2,938,665

READING HEAD

Nathan Huff Christopher, 1117 Rolfs Road, Falls Church, Va.

Filed Oct. 8, 1954, Ser. No. 461,297

4 Claims. (Cl. 235—61.11)

(Granted under Title 35, U.S. Code (1952), sec. 266)

This invention is in recording and reproducing equipment, and particularly, is a novel reading head for tape readers.

The invention described in the following specification and claims may be manufactured and used by or for the Government for governmental purposes without the payment to me of any royalty thereon.

One object of the invention is to provide a novel reading head, which will operate at a very rapid rate and which requires almost no adjustments of parts.

Another object is to provide in a reading head utilizing feeler pins means for revolving the same in contact with the tape being read thereby substantially decreasing the likelihood of tape breakage.

An additional object is to provide a tape reading head wherein perforation-sensing operations produce electrical contacts within the head, and wherein the results of such operations are read directly from slip rings on the head.

A further object is to provide a tape reading head of the general nature mentioned with means for rotating the same responsive to the tape being read.

Other objects will be apparent from a reading of the following specification and claims.

Figure 2:
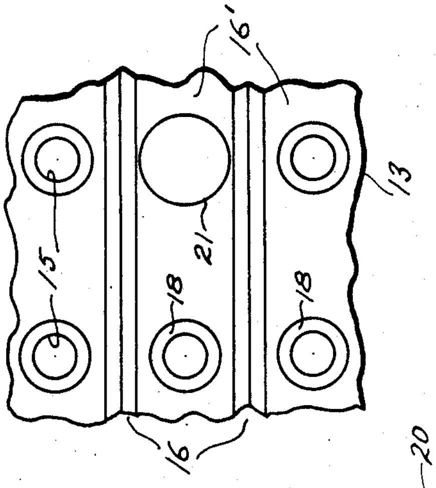
Figure 3:
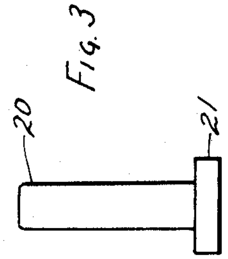
Figure 1:
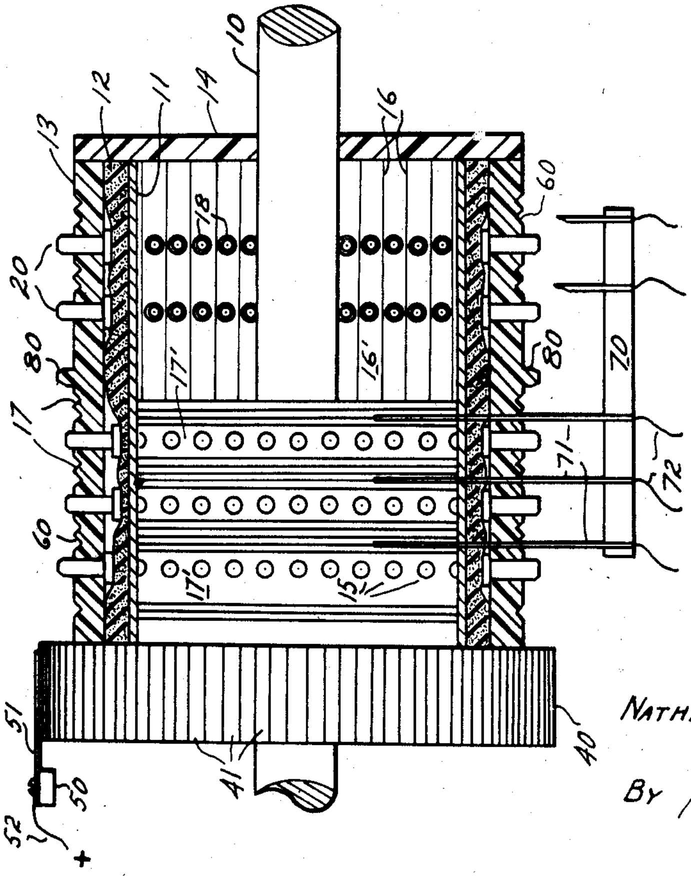

In the drawings, Figure 1 is an elevation of the reading head of my invention, partly in section, and partly diagrammatic, with certain elements removed, Figure 2 is a detail of the inner surface of the cylinder which forms part of my reading head, and Figure 3 is a detail of a feeler pin utilized in my invention.

Referring now to the drawings, the reading head may be seen to be generally cylindrical in form, and to be mounted on a shaft 10 for rotation therewith. Suitable supporting structure for the head, with low-friction bearings for shaft 10 should be assumed. The cylindrical head is in fact made up of an internal sleeve 11, preferably of metal, a sleeve 12 of sponge rubber or similar soft but resilient insulating material, and a further sleeve 13 of insulating plastic, mounted in any convenient fashion in end plate 14 and disc 40. These parts will be described in more detail hereinafter.

Outer sleeve 13 may be seen to contain a plurality of openings 15, aligned axially and circumferentially, and it should be understood that the openings are so spaced upon the drum that the circumferential rows register exactly with the five levels of perforations in a conventional five level tape. The spacing of the axial rows is such that, during rotation of the head, successive pins register with the successive perforation positions in the several levels. In the embodiment herein described, each circumferential row of openings 15 consists of forty-eight such openings, but this is a matter rather of design than of invention, and larger or smaller numbers of openings 15 may be utilized.

Extending through certain of the openings 15 may be seen feeler pins 20, having heads or flanges 21. The heads 21 are seated upon the sponge rubber sleeve 12 and the resilience thereof tends to maintain the pins in their extended positions, that is, with their points protruding well beyond the outer surface of sleeve 13 and their heads 21 pressed against the inner surface thereof. In practice, a pin is fitted into each of the openings 15, although not all the pins are shown. It will be obvious that a small pressure will depress a pin against the resistance of sponge rubber sleeve 12.

It should be understood at this juncture that the entire outer sleeve 13, which is formed of insulating material, is after construction, plated with a conducting material such as silver or copper. The plating should cover both inner and outer surfaces of the sleeve, and the inner surfaces of all the openings 15. It should not cover the ends of the cylinder, or, if this should occur, the plating thereon should be subsequently removed. After the plating is applied, grooves (which may be of the order of 1/64 inch) are formed therethrough, into the insulating material of the sleeve, in the following fashion: on the interior of sleeve 13, grooves 16 are formed axially between adjacent rows of openings 15, leaving strips 16' of conductive material each including an axial row of such openings; exteriorly of the sleeve, the grooves 17 are formed circumferentially between the rows of openings 15, leaving conductive strips 17' each including a circumferential row of openings; still further, in the interior of the sleeve each of the openings 15 is chamfered, as at 18, so as to remove silver plate from and slightly enlarge the base of each of said openings.

At the left of the structure, as shown in Figure 1, is a disc like member 40 which is secured to the structure already described and thus rotates with it. About its periphery are inserted contact segments 41, there being one segment for each axial row of openings 15, that is, forty-eight such segments in the embodiment being described.

Each of the segments 41 registers with one of the said axial rows of openings and is electrically connected to the strip of plate on the inside of the sleeve which includes such row. It is insulated from the other rows of openings and from the silver on the exterior of sleeve 13 in any convenient fashion.

Mounted adjacent the reading head on any convenient external structure, as 50, is an electrical contact 51 arranged to make brushing contact with the various segments 41 as the reading head revolves. Contact 51 is juxtaposed with the reading position of the head, normally the top thereof. The contact is connected by a lead 52 to a source of potential (not shown). It will readily be seen that upon rotation of the head, the segments 41 are sequentially connected to the source of potential, and that they in turn apply this potential to successive inner axial strips 16' of conducting material each of which includes an axial row of openings 15, and, assuming all parts to be assembled, includes also a row of pins 20 which are pressed by rubber sleeve 12 into engagement with the strip. The pins, with their heads 21, bridge the small gaps (chamfers 18) between the strips and the interior surfaces of openings 15 (see Figure 2). Potential thus is applied to an axial row of pins only when that row is in reading position.

On the outside of the reading head, that is, on the outside of the sleeve 13, may be seen a plurality of grooves 60 each located within one of the strips 17' already mentioned but not interfering with the openings 15 through which the pins 20 normally protrude. These latter mentioned grooves (60), as distinguished from grooves 16 and 17, are formed before sleeve 13 is plated, and the plating therein is not disturbed.

Arranged as convenient adjacent the reading head is a contact holder 70 of insulating material bearing five contact wires 71 spaced in accordance with the spacings of the several grooves 60 and so adjusted as normally to ride in the said grooves and to bear against the conductive plating therein.

The reading head includes a circumferential array of teeth 80 so spaced as to cooperate with the feed holes in a conventional tape. In the present case, however, these teeth have no tape-feeding function; their cooperation with the tape is rather for the purpose of rotating the reading head. The head of the present invention, in other words, assumes the use of a tape-transport apparatus which will supply tape at desired speed and under sufficient tension to depress a pin 20 against the resistance of rubber sleeve 12. Such apparatuses are well known in the art.

The operation of the reading head will be more apparent from the following description which assumes a tape transport device of the type just mentioned. With such a device, and assuming further that the feed holes in a tape are aligned with and engaged with feed teeth 80 of the head, if a perforation occurs in a particular level, the appropriate pin 20 will be in its extended position, and a circuit will be completed as follows: from the source (not shown) through lead 52, contact 51, uppermost contact segment 41, its associated interior axial conducting strip 16', a pin 20, a circumferential conducting strip 17' on the exterior of the head, a sliding wire contact 71, lead 72, and to the utilizing apparatus (not shown). If, however, no perforation occurs in a particular level, the reading pin 20 therefor is depressed by paper tension, and its base 21 is moved out of contact with the interior axial strip 16' (see Figure 1). Perfect breaking of contact at this point is assured by the chamfer 18 surrounding the base of each of the openings 15. It follows that whenever a feeler pin 20 is depressed, no circuit is formed between the potential source and the lead 72 corresponding to the depressed feeler pin.

The foregoing is in specific terms and many modifications of the structure described will suggest themselves; for the true scope of the invention, therefore, reference should be had to the appended claims.

I claim:

1. As an article of manufacture, a hollow perforated cylinder, the perforations thereof being aligned axially and circumferentially, said cylinder being formed of insulating material with a layer of conducting material on all surfaces thereof except for an unplated chamfer surrounding each perforation interiorly of said cylinder, a plurality of unplated axial lines on the interior thereof to isolate the axial rows each from the others, and a plurality of unplated circumferential lines on the exterior thereof to isolate the circumferential rows each from the others.

2. In an apparatus of the nature described, a hollow perforated cylinder mounted for rotation, the perforations thereof being aligned axially and circumferentially, the drum surfaces interiorly of said perforations being electrically conductive except adjacent the inner extremities thereof, means for electrically connecting said surfaces circumferentially on the exterior of said cylinder, means for electrically isolating adjacent rows of such connected surfaces, a plurality of electrically distinct axial conductors interiorly of said cylinder each encompassing a row of said perforations, a disc containing a contact member for each of said axial conductors and means for connecting said conductors to said members in pairs and for electrically isolating the same from the exterior surface of said cylinder, a source of potential, a contact connected thereto and arranged to sweep said members as said cylinder is rotated, and an output contact mounted for electrical cooperation with each of said circumferential connecting means.

3. In a tape reading head, a cylinder of insulating material, a plurality of parallel axial rows of perforations therein arranged to register with the several levels of perforations in a tape to be read, a pin mounted in each of said perforations in said cylinder for easy sliding movement therein, a base on each pin for limiting the movement of each pin in an outwardly direction, another cylinder of insulating, resilient material fitting snugly within said first-mentioned cylinder and bearing against the bases of said pins to urge the same normally upwardly therefrom, a plurality of electrical connections interiorly of said first-mentioned cylinder each including an axial row of said pins so long as the same are outwardly extended, and a further plurality of electrical connections exteriorly of said first-mentioned cylinder each including a circumferential row of said pins.

4. The tape reading head defined in claim 3, further characterized by each of said further plurality of electrical connections including not only the circumferential row of said pins, but also an electrical contact in sliding engagement with each of said further electrical connections.

References Cited in the file of this patent

UNITED STATES PATENTS

| | | |
|---|---|---|
| 847,157 | Brown et al. | Mar. 12, 1907 |
| 1,615,015 | Korn | Jan. 18, 1927 |
| 1,822,000 | Young | Sept. 8, 1931 |
| 2,269,894 | Cleven | Jan. 13, 1942 |
| 2,502,960 | Johnson | Apr. 4, 1950 |
| 2,727,091 | Zanner | Dec. 13, 1955 |